United States Patent [19]
Galle et al.

[11] 4,446,163
[45] May 1, 1984

[54] PROCESS OF MANUFACTURING A STARCH-BASED FOOD PRODUCT

[75] Inventors: Edward L. Galle, St. Paul; Roy G. Hyldon, Bloomington; William P. Egar, Wayzata, all of Minn.

[73] Assignee: The Pillsbury Company, Minneapolis, Minn.

[21] Appl. No.: 392,301

[22] Filed: Jun. 29, 1982

Related U.S. Application Data

[63] Continuation-in-part of Ser. No. 294,876, Aug. 21, 1981.

[51] Int. Cl.³ .......................... A23L 1/10; A23L 1/182
[52] U.S. Cl. ................................. 426/448; 426/459; 426/461; 426/511; 426/549
[58] Field of Search ............... 426/549, 618, 448, 449, 426/459, 461, 462, 463, 511

[56] References Cited

U.S. PATENT DOCUMENTS 3,071,471 1/1963 Gorozpe .............................. 426/462
4,243,690 1/1981 Murakami et al. .................. 426/557
4,368,210 1/1983 Murakami et al. .................. 426/557

Primary Examiner—Marc L. Caroff
Attorney, Agent, or Firm—Robert J. Lewis; Michael D. Ellwein; Mart C. Matthews

[57] ABSTRACT

A rice or other starch based product is provided which is manufactured from either broken rice or whole rice which is first ground and then pressure-formed into rice-shaped pieces. The pressure formed pieces are then heated by exposing them to saturated steam at a super atmospheric pressure above 0.5 psig in an autoclave for a sufficient time to gelatinize a major portion of the starch. After further processing, the rice pieces can be reconstituted by a consumer for consumption.

44 Claims, No Drawings

PROCESS OF MANUFACTURING A STARCH-BASED FOOD PRODUCT

BACKGROUND OF THE INVENTION

This is a Continuation-in-Part of copending patent application Ser. No. 294,876 filed Aug. 21, 1981.

In the rice industry, after the rice is harvested and is being prepared for processing and packaging, many of the rice kernels are broken or otherwise damaged. It has been common practice to separate the good rice kernels from the brokens. The brokens are then sold as rice brokens or brewers grits which bring substantially lower prices than whole kernel rice. Brokens are then used for purposes other than providing consumable rice, such as brewing or rice flour. It would be desirable then to provide a process for utilizing these brokens to upgrade their value.

The present invention provides a rice or other starch based product and a method of manufacture which can utilize rice brokens and make a rice product which is almost identical in appearance and taste of whole kernel rice. It has been found that by practicing the present invention, a rice product can be provided which is equal to and in some regards better than whole kernel rice while still being economical to produce and sell. One advantage provided by the present invention is that the final product is quick cooking, similar to those products referred to as "instant rice".

The processing of rice brokens is discussed in U.S. Pat. No. 3,071,471. In this patent, rice is first crushed to a size of 1/64 to 3/32 of an inch, after which the crushed rice is extruded and cut to form rice-like pieces. Prior to extruding, the pieces are steamed apparently to facilitate extruding. After extrusion, the formed pieces are dried before packaging. The product produced by such a process has attendant problems typical of which are: pasty, non-rice texture (poor eating quality), lack of cooking or steam-table tolerance and inconvenient preparation, requiring special utensils (e.g. "vaporizer") not normally found in a kitchen.

The present invention so far as it relates to rice provides a rice product and a process of manufacture which overcome the problems attendant with the use of processes such as that disclosed in the cited patent. The rice product unexpectedly has fast cooking properties and steam-table tolerance. The process also produces a rice product which has the following advantages: rice-like texture which can be controlled to simulate any type of rice, e.g. long grain, parboiled or short grain; excellent steam-table tolerance equivalent to parboiled, rice; and convenient, one-step preparation, add to boiling water and let stand for 10 minutes.

The process was designed for utilizing rice brokens and other rice bits which heretofore have been sold at substantially reduced prices as they were not considered consumable since they were broken. Further, the process is adaptable to high, starch-containing blends and other cereal grains. However, for the sake of expedience, the term "rice" will be used hereinafter and is to be construed to mean rice (long, medium and short grain), wheat, corn (both white and yellow), millet, oats, triticale, barley, rye, sorghum (milo), and starch-based products such as potatoes and cassava, or mixtures of the above etc.

OBJECT OF THE PRESENT INVENTION

A principal object of the present invention is to provide a process for utilizing rice brokens or whole kernels to produce a rice product of higher value without loss of nutrients. Another object of the present invention is to provide a rice product which is fast cooking, convenient, and tolerant to variations in home preparation. Another object of the present invention is to provide a rice product which has good steam-table tolerance which will permit being held long periods of time before consumption with minimal deleterious effects on the product. A still further object of the present invention is to provide a process which is straighforward and can utilize exiting manufacturing equipment.

Other objects and advantages of the present invention will become apparent from the following detailed description taken in connection with the accompanying drawings wherein are set forth, by way of illustration and example, certain embodiments of the present invention.

DETAILED DESCRIPTION OF INVENTION

Rice brokens or whole kernel rice or both, are used as a starting material. Product color is primarily a result of the color of the starting material. The preferred starting material should be cleaned and polished to meet standards for U.S. No. 1 grade or rice as identified in USDA standards §68.310, 68.311, 68.312, 68.313.

The term "rice" will be used hereinafter for simplicity. However, it is to be understood that the present invention is applicable to any ground or comminuted material so long as it contains starch in a quantity of at least about 20% by weight, on a dry basis of starch plus filler, if desired, (hereinafter flour), preferably at least about 50% starch and more preferably at least about 70% starch. The filler can be any compatible, edible material such as cellulose, protein, bran, gums, or combinations thereof, or other ground, edible material or materials mixed with the starch to form a mixtures of material hereinafter referred to as flour. Starch without filler can also be used as the flour.

It is preferred in order to obtain the flavor of a starting grain that the flour be a majority by weight of the characterizing grain or starch product. More preferably more than about 75% and most preferably more than about 90% by weight.

The rice is ground sufficiently to provide ease of extrudability and the desired texture. Preferably, it is ground to produce a flour finer than 150$\mu$ (ASTM 100 mesh); more preferably finer than 106$\mu$ (ASTM 140 mesh); and most preferably finer than 75$\mu$ (ASTM 200 mesh) as analyzed by sifting a 25 gram sample for 3 minutes on an Alpine Model AJS 200 Air-Jet Sieve. Fine grinding of the rice provides good textural quality, i.e. a non-gritty mouthfeel and helps improve down stream processing steps. Other grains or materials may not require such fine grinding, particularly softer grains such as wheat. An 850$\mu$ (ASTM 20 mesh) grind can be used for wheat.

Grinding of rice can be accomplished by any suitable grinding process as is known in the art, and preferably, grinding is accomplished by impact milling followed by air classification to separate the flour from oversized material. The oversized material is recycled to the grinder for regrinding. Grinding of other grains can be done in a similar manner after removal of the desired amount of bran or outer layers. It is also possible to select products from commercial milling operations, such as wheat flour, samolina, rye flour, corn flour etc.

After grinding, the flour is hydrated sufficiently to provide good pressure-forming characteristics preferably by pressure applied through extrusion, molding etc. The flour is hydrated to form a blend of flour and water in a suitable manner whereby the blend has a moisture content in the range of between about 20% and about 40%, more preferably between about 27% and 36%, and most preferably in the range of between about 29% and 31% by weight of blend. The water is absorbed into the flour particles so that the mixture is formable. The hydration can be by any suitable method. Preferably, hydration is conducted in a continuous mixer by metering a controlled amount of water into a controlled amount of flour. Elevated temperatures enhance the forming and stability of the blend in the forming step where hydration is a result of starch granules by increased temperature. It is preferred that the temperature during hydration be between about 120° F. and about 275° F.; more preferable between about 140° F. and about 200° F.; and most preferable between about 150° F. and about 170° F. Lower temperatures can be used for some grains e.g. ambient (70° F.) to 120° F. can be used and is particularly useful for wheat hydration. These lower temperatures can be used for those grains which have functional protein which hydrates to enhance product formation and structure, thus making the higher temperatures required for swelling of starch unnecessary and often undesirable. Such temperatures, if desired, should be kept below the temperature which would result in protein denaturation, reducing its desired hydration capacity.

It is to be understood that the water and flour can be mixed and subsequently heated as, for example, in the extruder to simplify the hydration step.

Prior to hydration, processing aids and additives can be added to the flour or the blend. For example, substances such as monoglycerides, diglycerides, mono/diglycerides, stearic acid, citric acid or titanium dioxide can be added to the flour before the water addition to improve the properties of the product as, for example, lightness or translucency. Also, reducing agents can be added to the water such as sodium bisulfite which would help inhibit browning in subsequent processing. Also, nutritional additives can be added to the flour or water prior to extrusion so that the nutrients are intimately interspersed within the rice product. Typical nutrients added to cereal grains include vitamins and minerals such as: thiamin, riboflavin, niacin, iron and calcium. Riboflavin and calcium are not presently added to enriched rice because they detract from its appearance. Furthermore, the washing step commonly used in rice preparation removes a large amount of the enrichment. This invention overcomes both of these shortcomings.

After hydration, the blend is pressure-formed into integral particles of a desired shape. Extrusion or other types of molding can be used. Extrusion is preferred to form discrete segments, particles, or granules which can be made to resemble whole kernel product. It is preferred that the extrusion be done in a screw extruder which provides good blend mixing. Extrusion pressure preferably is in the range of between about 400 psi and about 1800 psi; preferably in the range of between about 600 psi and 1200 psi; and most preferably in the range of between about 900 psi and 1100 psi.

The blend can be heated to help hydration. This can be done during the hydration step and/or in the extruder. The temperature of the water/flour mixture in the extruder should be in the range of between about 130° F. and about 200° F.; preferably between about 140° F. and about 180° F.; and most preferably between about 155° F. and about 170° F. Lower temperatures can be used for some grains as in the initial above described hydration.

The pressurized flour/water mixture can be extruded through a die plate and cut upon exiting from openings in the die plate. For forming rice shaped pieces it is preferred that the die openings be oblong, i.e. the minor axis of the grains are in the direction of extrusion. This has been found to form a more whole kernel appearing product.

The rice shaped products have been formed using a standard DeMaCo S-25 laboratory extruder with a 440 c stainless steel die plate containing 18 die holes. The inserts are made of Delrin A/F. Each orifice has a major axis dimension of 0.281" and a minor axis of 0.063". Orifice lengths and entrance geometry are varied to equalize linear flow rates at each position on the die face to produce a uniform piece size. The piece cutter is a high speed rotary knife adjusted to cut each piece approximately 0.063" long. The piece length at each orifice can be changed by die geometry to simulate the natural variation in grain size. Other die sizes and shapes can be used depending on the desired end product. Pasta making equipment can be used to produce a variety of pasta type products. Also, product can be made in larger sizes and different shapes.

The blend in the extruder is treated as a pseudo plastic fluid with a flow consistency between 3 and 8 lb in$^2$/min.; more preferably between 4 to 7.5 lb in$^2$/min.; and most preferably between 5.8 to 7.5 lb in$^2$/min. The extrusion rate is important and will be determined by flow consistency of the blend and the extruder design, operating conditions, and die geometry.

After forming into granules or other suitable particles, processing aids can be applied to the granules to help downstream processing steps. For example, the formed granules can be coated with an emulsifier such as a distilled mono/diglyceride to decrease surface stickiness and enhance texture. Such emulsifiers can be applied in a quantity in the range of between about 0.025% and about 0.2% by weight of final product by spraying a dilute dispersion of distilled mono/diglyceride in water onto the formed granules. The emulsifier, such as a mono/diglyceride, can complex with a starch during subsequent processing steps to help reduce stickiness etc. Other processing aids, such as edible oils, lecithin, or emulsifiers can be used as is desired.

The formed granules are then subjected to a heating step. Heating is conducted under conditions to substantially, and preferably, to completely and uniformly gelatinize the starch in the granules with minimal or no degradation of the starch. Puffing in rice should be avoided. Preferably, the heating step is conducted such that there will be minimal or no moisture loss from the granules to give the desired density and compactness. The formed granules have moisture content within the ranges as described above for the hydrated flour. The heating step molds the structure of the formed granules and, if used, can react applied emulsifier with the starch.

Preferably, the heating step is an autoclaving step wherein the granules are exposed to steam at super atmospheric pressure. Preferably, the environment is saturated steam in the range of between about 0.5 psig and 75 psig, more preferably between about 3 psig and 35 psig, and most preferably about 5 psig and 20 psig. The time of exposure for heating is generally inversely related to the temperature and pressure of the heating step, i.e. the higher the temperature or pressure, the lower the required time. If the granules are left in too long a period of time, they will have a tendency to brown which is a Maillard browning reaction. If left in too short of time, the product will become grainy or chalky in texture and have poor integrity. It is preferred that the time of heating be in the range of between about 1 minutes to 30 minutes; more preferably in the range of between about 3 minutes and about 15 minutes; and most preferably in the range of between about 4 minutes and 12 minutes.

The temperature and presssure of saturated steam are directly related (see "Thermodynamic Properties of Steam", by Keenan & Keyes, 1936).

Although not being bound by the following theory it is provided in order to better understand the invention. At atmospheric steam pressue (212° F.) it is not possible to obtain the desired degree of gelatinization no matter how long the product is held, hence this product would have the same characteristics as the "short time" product described above. Results of excessive pressures are not entirely the same as excessive time. Excess pressure causes cell disruption and starch degradation which is characterized by stickiness and solubilization. The extent of this problem is related to the time at the high pressure, e.g. the logical approach of high steam pressure for a very short time can result in a product with a sticky, degraded surface and an underprocessed "short time" type of center. Such a product might not be undesirable if one wants a sticky "Japanese" style rice.

Preferably the heating is done in an autoclave. When the granules have been sufficiently heated to the desired degree of gelatinization of at least about 60% preferably at least about 80% and more preferably at least about 95% (as measured by X-ray diffraction), it is preferred that their moisture content be within the ranges as described above for the hydrated flour.

The formed granules can also be heated in a multiple stage process. It has been observed that the granules tend to become somewhat sticky during the autoclaving step. If this step is preceded by a preheating step with steam at sub-atmospheric or atmospheric pressure, the stickiness is substantially decreased. The two-stage process also seems to increase the tolerance of the product to autoclaving, resulting in a more uniform cook in the finished product. The preheating is conducted at a temperature above the gelatinization temperature and preferably above about 180° F. and most preferably at about 212° F. (i.e. at atmospheric pressure). This initial heating step is of some benefit regardless of the heating time; however, maximum benefit seems to require a heating time above about 5 minutes for rice-sized granules.

While the product is normally dried to produce a shelf stable product after the heating step described above, it is also possible to obtain an intermediate or full moisture product at this point of the process.

A full moisture product would be obtained by adding back, after the heating step, sufficient water to obtain a normal cooked moisture content of about 60% by weight (for long grain rice), and freezing or canning the finished product.

Intermediate moisture products are defined as those between the moisture content of dry rice and full-moisture rice, or about 15% to about 55% moisture by weight. For this purpose, the product should have a water activity ($A_w$) of less than 0.85, be sterilized and aseptically packed, or at least pasteurized and refrigerated. The $A_w$ can be kept to less than 0.85 either by reducing the final moisture content and/or by the addition of $A_w$ controls such as using glycerine to replace part of the water in the product formulation.

Dry product is defined as having an $A_w$ of less than about 0.65. This is obtained by drying the granules after the previously-described heating step. $A_w$ is normally measured through an equilibrium-testing procedure.

Preferably, the formed granules have a moisture content after drying in the range of between about 6% and 16% by weight; more preferably in the range of between about 8% and about 14%; and most preferably in the range of between about 10% and about 12%. Product can be dried in any suitable manner to remove undesired moisture such as in a continuous-heating oven and is done at an elevated temperature. Preferably, the drying temperature is in the range of between about 150° F. and about 600° F.; more preferably in the range of between about 250° F. and about 450° F.; and most preferably in the range of between about 300° F. and about 400° F. In the case of wheat pasta the drying temperature should be below about 300° F. and preferably between about 150° F. and 250° F. The drying time is adjusted to obtain the desired product moisture level. The time of drying is related to temperature and air flow. The higher the temperature and/or air flow, the lower the required time. Typical drying times have been between 1 and 5 minutes at higher temperatures. At 150° F. drying temperatures can be as long as 3 hours.

Drying provides a formed granule which is easily rehydratable or reconstitutable and has a porous structure of good flavor and texture. Drying also enhances the stability of the formed granule.

The drying condition can be adjusted from very high temperatures which puff the granules, to intermediate temperatures which neither puff nor shrink the granule, but provide a porous structure resulting from moisture loss, to low temperatures which allow the granule to shrink and result in a hard, non-porous, glassy structure. These differences control the rate of rehydration and can affect product texture.

After drying, the formed granules are cooled. The cooling step can also be utilized to stop the drying action. Preferably, the product is cooled to room temperature.

After cooling, the product can be bleached as is known in the art as, for example, using chlorine or peroxide. This will provide the desired degree of whiteness. Bleaching products is well known in the art as disclosed in Cereal Flours and Related Products, F.D.C. Regulations, Part 15.

The above process can be modified to provide different types of end products, for example, rice bran can be added to the flour so that a quick cooking brown rice can be provided. Also, other flavors, filler, cereal grains or other products can be added prior to the extrusion step to provide homogeneous mixture and homogeneous end product. The present invention provides formed granules which are very close in appearance to the natural-occurring product, are quick cooking and pleasing in flavor. Also, surprisingly, it was found that rice product produced in accordance with the above disclosure was stable on a steam table for several hours, i.e., greater than 4 hours without the product becoming pasty. This could be due to the limitation of starch gelatinization by controlling the time and temperature or possibly available moisture. Further, by utilization of the above-described process, a product can be produced which has all the natural components of the natural product, or can have in addition thereto additional components which heretofore have not been successfully included in rice, other whole cereal grain, and starch-based products.

The final product is characterized by: uniformity of components, i.e. less than about a 2% variation throughout the granules, exclusive of coating or other materials added after forming; the starch is the predominant binder in those products which have little or no functional protein, i.e. at least about 90% of the binding is due to starch; there is little or no starch degradation, i.e. there is less than about 5% degraded starch and preferably substantially no or no degraded starch; there is greater than about 95% gelatinization and preferably substantially complete gelatinization; and is a precooked, reconstitutable product.

The following are examples showing the operability of the present invention.

EXAMPLE I 1000 grams of vacuum-dried riced potato (80% starch on dry basis) was ground to a fine flour which was then hydrated to a moisture content of about 40%. This blend was extruded in a screw extruder barrel at 120° F. barrel temperature. The extrudate was cut into rice shaped granules. These granules were autoclaved for 3 minutes at 250° F. (15 psig), after which they were dried for 1 minute at 400° F. to a moisture content of 10% by weight.

The dried granules were reconstituted by adding 40 grams of product to ⅓ cup of boiling water and let stand for 10 minutes. The prepared product was judged to have good potato flavor and texture and was neither gummy nor sticky.

EXAMPLE II

Fine-ground rice flour was hydrated to a moisture content of 30% by weight. The hydrated flour was extruded in a pasta press which was at a temperature of 160° F. The extrudate was cut into rice-sized pieces. These pieces were coated with a 4% monoglyceride in water dispersion to give a 0.1% level of monoglyceride on the rice pieces. The coated rice pieces were divided into three 1000 gm batches.

These three batches were heated with saturated steam at 212° F. for 15 minutes, 30 minutes and 60 minutes, respectively. Each of the batches was dried at 400° F. for 2 minutes.

75 gms of each dried batch was added to ⅔ cup of boiling water and allowed to stand for 10 minutes. All reconstituted product was judged to be unacceptable because they were dry, rough and grainy in the mouth, and had raw starchy flavor.

EXAMPLE III

Rice flour was hydrated and extruded, as in Example II. However, the formed pieces were heated in an autoclave with saturated steam at 15 psig, at temperature of 250° F. for 5 minutes.

Upon removal from the autoclave, the rice pieces were loosely matted together. The pieces were allowed to cool and were separated. The separated pieces were dried at 400° F. for 2 minutes.

75 gms of pieces were added to ⅔ cup of boiling water and allowed to stand for 10 minutes.

The reconstituted product was judged to have excellent texture and flavor.

EXAMPLE IV

Rice flour was hydrated and extruded as in Examples II and III. However, the formed pieces were preheated prior to autoclaving.

The pieces were preheated with atmospheric steam (212° F.) for 10 minutes. They were then autoclaved at 10 psig (240° F.) for 6 minutes. The autoclaved product was only slightly adhered together, i.e. less than the product of Example III.

The pieces were then dried at 400° F. for 2 minutes.

75 gms of product were added to ⅔ cup of boiling water and allowed to stand for 10 minutes. The product was judged to have excellent texture and flavor.

EXAMPLE V 1000 grams of yellow corn flour was hydrated to a moisture content of 32% by weight. The hydrated corn flour was extruded in a pasta press which was at a temperature of 165° F. The extrudate was in the form of elbow macaroni. These elbows were autoclaved at 250° F. for 5 minutes after which they were dried for 5 minutes at 275° F.

The dried "macaroni" was reconstituted by adding the product to boiling water and boiling for 15 minutes. The prepared product was judged to have a good corn flavor and a firm pasta texture.

EXAMPLE VI

White corn meal was ground to a fine flour which was then hydrated to a moisture content of 32% by weight. The hydrated white corn flour was extruded into macaroni elbows, autoclaved and dried as in Example V.

The reconstituted "macaroni" was judged to have very good mild flavor and a firm texture.

EXAMPLE VII

A sample of pearl millet was debranned to remove 20% bran and yield 80% millet. The debranned millet was ground to a fine flour which was then hydrated to a 31% moisture. The hydrated flour was extruded in a pasta press at a temperature of 160° F. The extrudate was cut into rice shaped pieces. These pieces were autoclaved for 8 minutes at 240° F., after which they were dried for 2 minutes at 400° F.

75 grams of the pieces were added to ⅔ cup of boiling water and allowed to stand for 10 minutes.

The reconstituted product was judged to have a strong millet flavor with rice like soft texture.

EXAMPLE VIII

A sample of soft white wheat second clears flour was hydrated to a moisture of 32%. The hydrated flour was extruded in a pasta press which was at a temperature of 116° F. The extrudate was in the form of elbow macaroni. The elbows were autoclaved for 10 minutes at 240° F., after which they were dried for 3 hours at 150° F.

The dried elbows were reconstituted by adding to boiling water and boiling for 9 minutes. The elbows were drained and evaluated. They were judged to have good pasta flavor, "al dente" texture and deep yellow color.

EXAMPLE IX

A blend of 90% corn starch and 10% yellow corn flour was hydrated to a moisture of 32% moisture. The hydrated blend was extruded in a pasta press which was at a temperature of 165° F. The extrudate was in the form of elbow macaroni. The elbows were autoclaved for 5 minutes at 250° F., after which they were dried at 275° F. for 5 minutes.

The dried elbows were reconstituted by adding to boiling water and boiling for 12 minutes. The elbows were drained and evaluated; they were judged to have good mild flavor and pasta texture.

What is claimed and desired to be secured by Letters of Patent is:

1. A process of manufacturing a starch-based food item comprising the steps of:
   providing a mixture of ground material, with said material comprising at least about 20% starch by weight of mixture on a dry basis;
   hydrating said mixture to form a blend, said mixture being hydrated sufficiently to provide pressure formability to said blend;
   pressure forming said blend to form individual pieces; and heating the pressure formed pieces by exposing said pieces to substantially saturated steam at a super atmospheric pressure above about 0.5 psig in an autoclave for a time sufficient to gelatinize a major portion of said starch.

2. A process as set forth in claim 1 wherein said heating is done at a pressure in the range of between about 3 psig and about 35 psig in an environment of substantially saturated steam.

3. A process as set forth in claim 2 wherein said heating is done at a pressure in the range of between about 5 psig and about 20 psig.

4. A process as set forth in claim 1, 2 or 3 wherein said forming is done by extrusion.

5. A process as set forth in claim 1, 2, or 3 wherein said mixture is in the form of a flour which has been ground to a fineness of less than about 100 mesh.

6. A process as set forth in claim 5 wherein said flour is ground sufficiently such that at least about 99% is finer than about 140 mesh.

7. A process as set forth in claim 6 wherein said flour is ground to a fineness such that at least about 99% is finer than about 200 mesh.

8. A process as set forth in claim 1, 2, or 3 wherein the mixture is hydrated to form a blend with the blend having a moisture content within the range of between about 20% and about 40% by weight of blend.

9. A process as set forth in claim 8 wherein the blend has a moisture content in the range of between about 27% and about 36% by weight of blend.

10. A process as set forth in claim 9 wherein said blend has a moisture content in the range of between about 29% and about 31% by weight of blend.

11. A process as set forth in claim 1, 2, or 3 wherein the thus heated particles are dried sufficiently to have a water activity level of less than about 0.85.

12. A process as set forth in claim 11 wherein said particles are dried to a water activity level of less than about 0.65.

13. A process as set forth in claim 1, 2, or 3 wherein said formed particles are reconstituted to a higher moisture content by adding back water.

14. A process as set forth in claim 1, 2, or 3 wherein prior to heating said particles, said particles are preheated at a temperature above the gelatinization temperature of the starch sufficiently to reduce stickiness during heating.

15. A process as set forth in claim 1, 2 or 3 wherein said material includes a majority by weight of rice.

16. A process as set forth in claim 1, 2 or 3 wherein said material include a majority by weight of wheat.

17. A process as set forth in claim 1, 2 or 3 wherein said material include a majority by weight of corn.

18. A process as set forth in claim 1, 2 or 3 wherein said material includes a majority by weight of millet.

19. A process as set forth in claim 1, 2 or 3 wherein said material include a majority by weight of potato.

20. A process as set forth in claim 1, 2 or 3 wherein said material include a majority by weight of sorghum.

21. A process as set forth in claim 1, 2 or 3 wherein said material include a majority by weight of rye.

22. A process as set forth in claim 1, 2 or 3 wherein said material include a majority by weight of barley.

23. A process as set forth in claim 1, 2 or 3 wherein said material includes a majority by weight of triticale.

24. A process as set forth in claim 1, 2 or 3 wherein said material include a majority by weight of oats.

25. A process as set forth in claim 1, 2 or 3 wherein said material include a majority by weight of cassava.

26. A process as set forth in claim 1 wherein said ground material also includes filler and
   each said heated piece is predominantly bound together by starch and said starch being at least about 95% gelatinized and less than about 5% degraded.

27. A process as set forth in claim 26 wherein substantially all of the starch is gelatinized.

28. A process as set forth in claim 26 wherein there is substantially no degradation of the starch.

29. A process as set forth in claim 26 wherein said ground material includes starch and filler which were ground to a mesh size of less than about 100 prior to pressure forming.

30. A process as set forth in claim 29 wherein the mesh size of said starch and filler prior to pressure forming was less than about 140.

31. A process as set forth in claim 30 wherein the mesh size of said starch and filler prior to pressure forming was less than about 200.

32. A process as set forth in claim 26 wherein said starch is present in an amount of at least about 50% by weight of starch plus filler on a dry basis.

33. A process as set forth in claim 32 wherein said starch is present in an amount of at least about 70% by weight of starch plus filler on a dry basis.

34. A process as set forth in claim 26, 27 or 28 wherein said filler and starch includes a majority by weight of rice.

35. A process as set forth in claim 26, 27 or 28 wherein said filler and starch includes a majority by weight of wheat.

36. A process as set forth in claim 26, 27 or 28 wherein said filler and starch includes a majority by weight of corn.

37. A process as set forth in claim 26, 27 or 28 wherein said filler and starch includes a majority by weight of millet.

38. A process as set forth in claim 26, 27 or 28 wherein said filler and starch includes a majority by weight of potato.

39. A process as set forth in claim 26, 27 or 28 wherein said filler and starch includes a majority by weight of sorghum.

40. A process as set forth in claim 26, 27 or 28 wherein said filler and starch includes a majority by weight of rye.

41. A process as set forth in claim 26, 27 or 28 wherein said filler and starch includes a majority by weight of barley.

42. A process as set forth in claim 26, 27 or 28 wherein said filler and starch includes a majority by weight of triticale.

43. A process as set forth in claim 26, 27 or 28 wherein said filler and starch includes a majority by weight of oats.

44. A process as set forth in claim 26, 27 or 28 wherein said filler and starch includes a majority by weight of cassava.

* * * * *